United States Patent [19] [11] 4,124,856
Tarr [45] Nov. 7, 1978

[54] CAMERA HAVING DUAL FILM CAPACITY
[75] Inventor: Fred P. Tarr, Lexington, Mass.
[73] Assignee: Polaroid Corporation, Cambridge, Mass.
[21] Appl. No.: 811,082
[22] Filed: Jun. 29, 1977
[51] Int. Cl.² .................. G03B 17/50; G03B 19/06
[52] U.S. Cl. .................................. 354/86; 354/154; 354/187; 354/210
[58] Field of Search .............. 354/210, 104, 119, 187, 354/188, 236, 192–194, 224, 225, 83, 85, 86, 154, 157, 158

[56] References Cited
U.S. PATENT DOCUMENTS

| 2,169,422 | 8/1939 | Kelley | 354/188 X |
| 2,696,152 | 12/1954 | Roehrig | 354/210 |
| 3,608,456 | 9/1971 | Hauser | 354/154 X |
| 3,961,348 | 6/1976 | Miyazaki | 354/210 X |

FOREIGN PATENT DOCUMENTS 2,461,193 7/1975 Fed. Rep. of Germany .......... 354/210
202,979 5/1924 United Kingdom ................. 354/188

Primary Examiner—John Gonzales
Attorney, Agent, or Firm—Alfred E. Corrigan

[57] ABSTRACT

A camera having first and second housing sections, each of which is adapted to receive a film cassette containing at least one film unit. The camera is of the single reflex type and includes a pair of opaque members each of which is mounted for movement between a first position wherein it overlies a film cassette thereby allowing the camera's lens and shutter assembly to remain open during viewing and focusing without prematurely exposing a film unit and a second position wherein the film unit is uncovered in preparation for exposure. The first and second housing sections are coupled together for movement between (1) an extended position wherein they define an angle therebetween and wherein either the film unit in the first or second housing section may be exposed and (2) a collapsed inoperative position wherein one of the housing sections overlies the other thereby enhancing the compactness of the camera.

8 Claims, 7 Drawing Figures

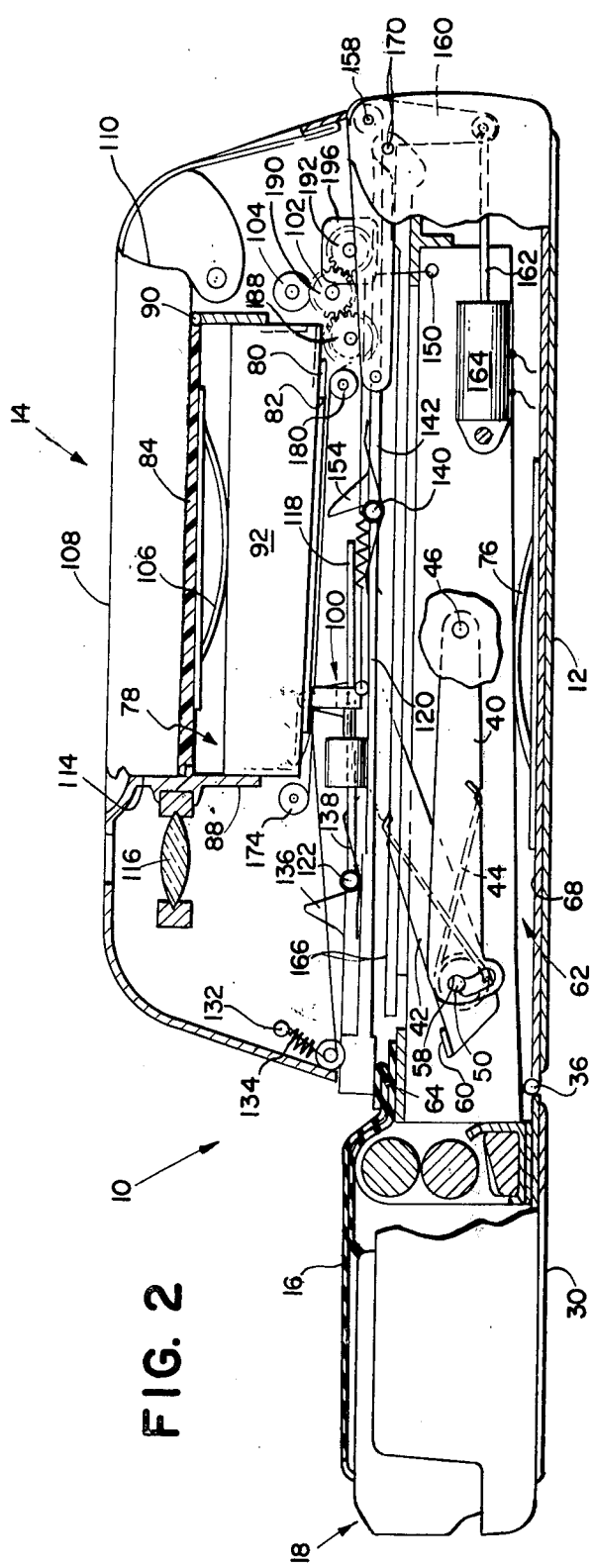
FIG. 2
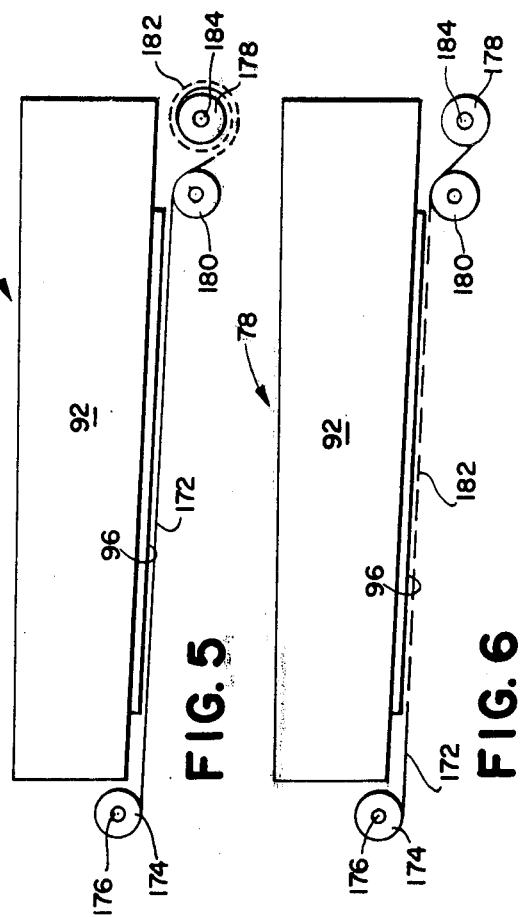
FIG. 5
FIG. 6

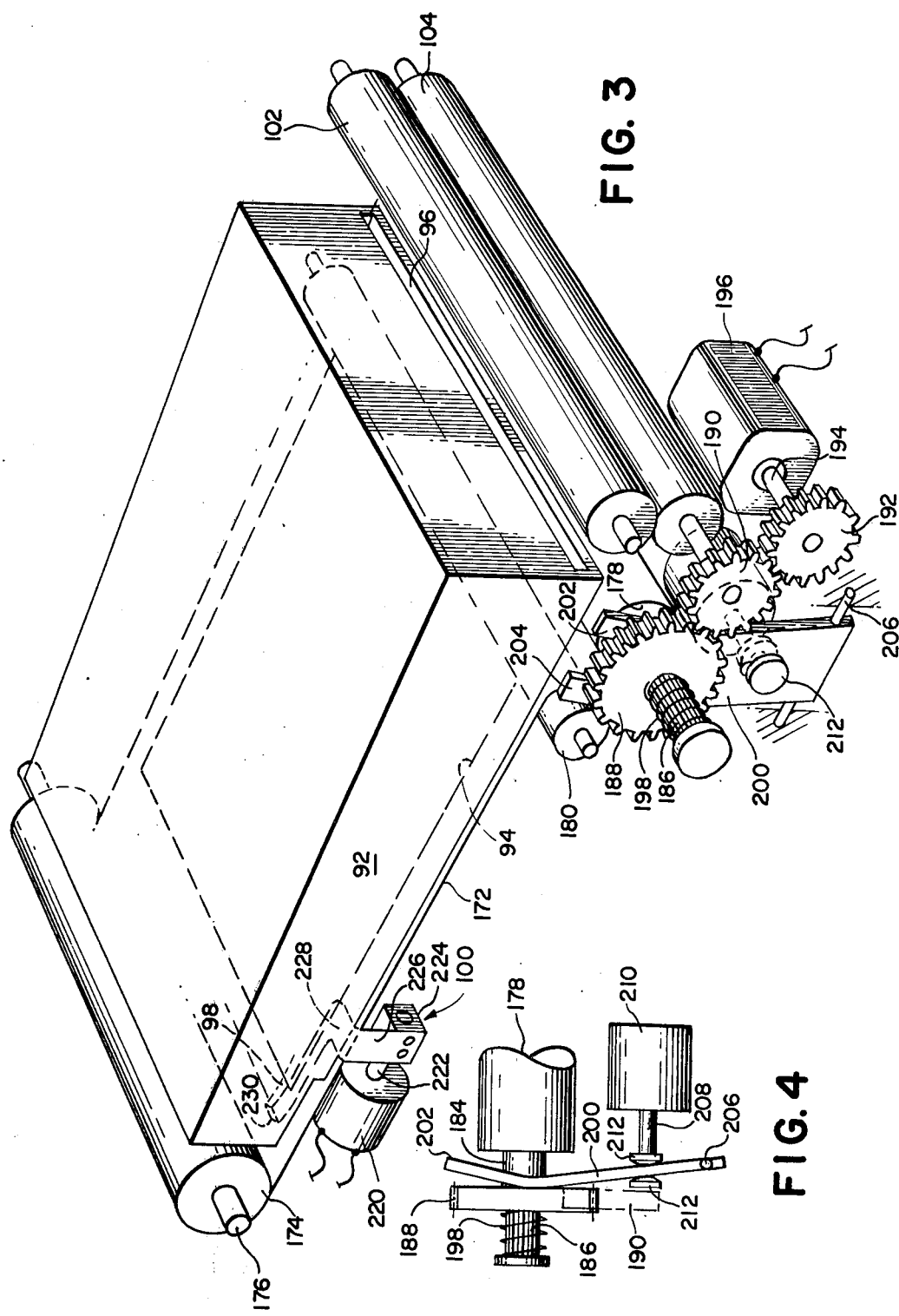

CAMERA HAVING DUAL FILM CAPACITY

RELATED APPLICATION

This application is related to my copending application Ser. No. 810,935 entitled Exposure Preventing Shade and filed on even date herewith.

BACKGROUND OF THE INVENTION

1. Field of the Invention

This invention relates to cameras of the collapsible type having provision for more than one supply of light sensitive material for recording an image.

2. Description of the Prior Art

Cameras of the type having two or more film chambers are well known and generally include an exposure system which geometrically reverses the image of the subject the same amount of times regardless of which film in the camera is being exposed. Examples of this type of camera are described in U.S. Pat. Nos. 2,988,973, 2,616,342, and 2,554,349. Other cameras, such as those described in U.S. Pat. No. 3,608,456 and German Offenlegungschrift No. 2,461,193, employ an exposure system which geometrically reverses the image of the subject an even number of times when one type of film is to be exposed and an odd number of times when another type of film is to be exposed. With the possible exception of the camera disclosed in U.S. Pat. No. 2,554,349, the above described cameras all suffer from the same disability, namely, bulkiness. The camera described in U.S. Pat. No. 2,554,349, while apparently being of the collapsible type, suffers from the fact that the film holder which holds two types of film must be removed from and reattached to the camera everytime the operator wishes to change the type of film he wants to expose.

SUMMARY OF THE INVENTION

In contradistinction to the foregoing, the instant invention provides a camera having first and second housing sections each of which includes means for supporting a film cassette containing at least one film unit. The housing sections are coupled to each other for movement between an extended operative position in which they define an angle therebetween and a collapsed inoperative position in which the housing sections are in superposed relation with each other. The film unit adapted to be located in the first housing section is preferably of the type described in U.S. Pat. No. 3,415,644 while the one to be located in the second housing section is preferably of the type described in U.S. Pat. Nos. 3,594,165 or 3,396,647. The camera is provided with a single lens reflex viewing system which includes two mirrors mounted adjacent to and in facing relation with each other for reflecting the image of the subject from the camera's normally open lens and shutter assembly to the camera's viewing lens. Each of the mirrors is provided with a pivotal mounting and a spring arrangement which allows the mirrors to automatically pivot from their operative position to an imoperative position as the housing sections of the camera are moved from their extended position to their collapsed position.

In order to prevent premature exposure of the film units in each cassette during viewing and focusing of the subject, an opaque member is mounted in each housing section to prevent any light within the camera from striking the film unit positioned in the associated housing section. The opaque members are mounted for individual movement to uncovering positions in accordance with the film unit which has been selected for exposure.

A pair of pressure-applying rollers is mounted within each housing section for receiving an exposed film unit as it is being advanced from its cassette for spreading a processing fluid across its photosensitive area to initiate formation of a visible image within the film unit, as is well known in the art. Preferably, the film unit is then moved to the exterior of the camera where the image may be viewed. In those instances where the film unit cannot be advanced directly to the exterior of the camera by the rollers, a dark chamber may be coupled to one of the housing sections so as to receive the film unit and maintain it is an environment wherein development of the image may continue until it reaches a level whereat further development will not be adversely affected by the light outside the dark chamber. At this time the film unit may be removed from the dark chamber for viewing.

An object of the invention is to provide a collapsible camera of the type having provision for more than one supply of film for recording an image.

Another object of the invention is to provide a collapsible camera of the type adapted to receive two separate types of film with a single lens reflex viewing system which automatically moves from an erected operative position to a folded position in response to collapsing the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2 is an elevational view, partly in section, of the camera shown in FIG. 1 in its collapsed position;

FIG. 3 is an enlarged perspective view of a film cassette adapted for use with the camera of FIG. 1 and components of the camera relating to the exposure and processing of a film unit;

FIG. 4 is an end view of a portion of FIG. 3;

FIG. 5 is a schematic representation of an opaque shade shown in its light blocking position relative to the exposure aperture of a film cassette;

FIG. 6 is a view similar to FIG. 5 showing an aperture in the opaque shade located in alignment with the exposure aperture in the film cassette.

DETAILED DESCRIPTION OF THE INVENTION

Figure 1:
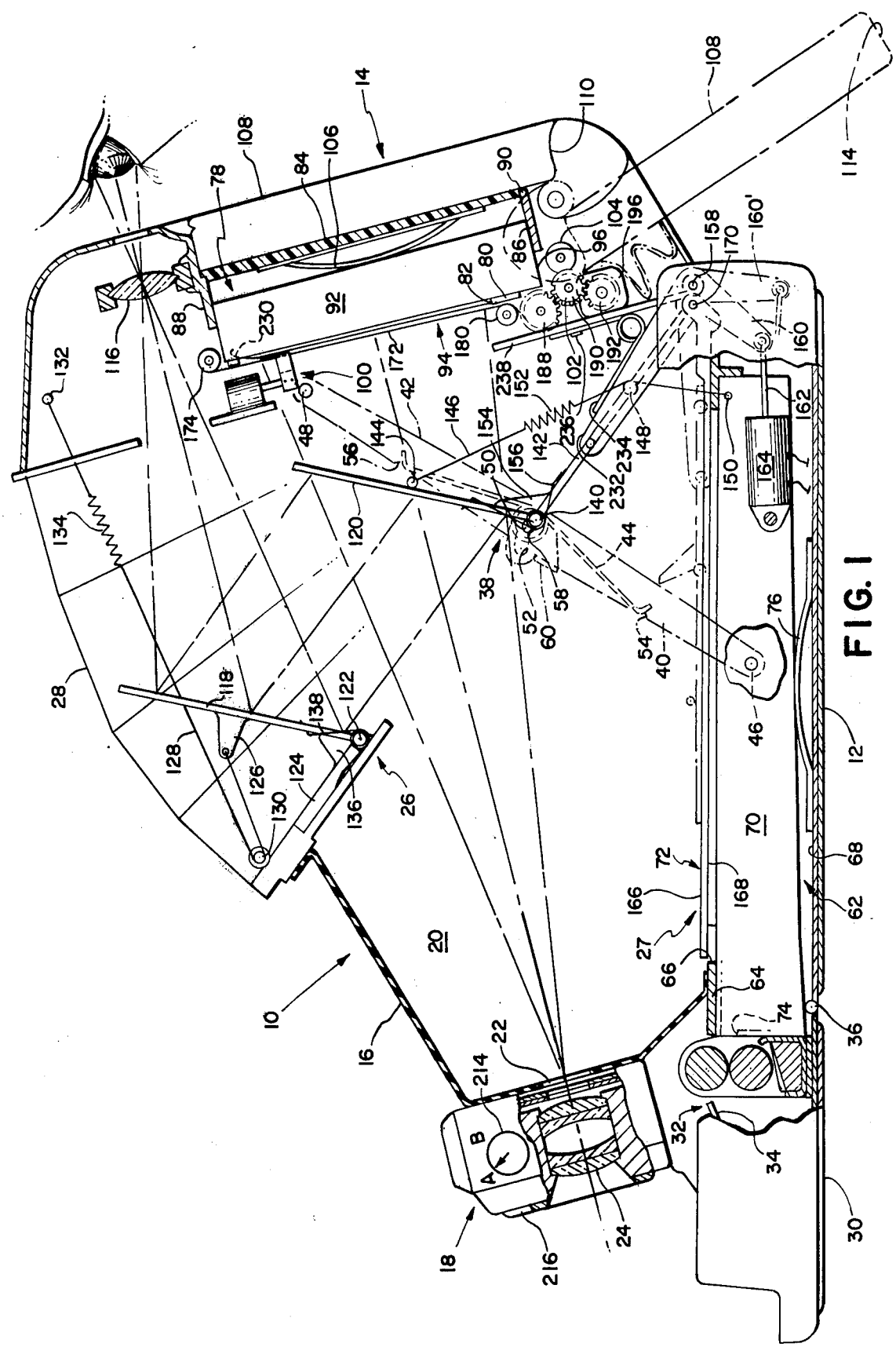
FIG. 1 is an elevational view, partly in section, showing a collapsible self-developing type camera having provision for simultaneously receiving two different types of film.

Reference is now made to FIG. 1 of the drawings wherein is shown a camera 10 of the type adapted to receive two film cassettes containing film units of different types, e.g., one cassette may contain film units of the type which are adapted to be exposed and viewed from the same side (see U.S. Pat. No. 3,415,644) while the other cassette may contain film units of the type which are adapted to be exposed through one side and viewed through the opposite side (see U.S. Pat. No. 3,594,165). The camera 10 includes a plurality of housing sections 12, 14, 16 and 18 pivotally coupled to each other for movement between an erect operative position, as shown in FIG. 1, and a collapsed inoperative position, as shown in FIG. 2. The space between the housing sections 12, 16 and 18 is enclosed by a bellows 20 having an opening 22 adjacent the camera's lens and shutter assembly 24, an oppositely positioned opening 26 and an adjacent opening 27. The space between the open end 26 and the housing section 14 is enclosed by a bellows 28. Extending forwardly of the housing section 12 is a spread roller housing section 30 which carries a pair of pressure-applying rollers 32 and a deflecting plate 34. The spread roller housing section is pivotally coupled at 36 to the housing section 12 for counterclockwise movement from its operative position shown in FIG. 1 to a position wherein a film cassette may be inserted into the housing section 12. Basically, the camera portion defined by the housing sections 12, 16, 18 and 30 and the bellows 20 is the same as that disclosed in U.S. Pat. No. 3,709,122.

The various housing sections of the camera are maintained in the erected operative position by an erecting link 38 comprised of legs 40 and 42 and a spring 44. The leg 40 is pivotally coupled at 46 to the housing section 12 while the leg 42 is pivotally coupled at 48 to the housing section 14. The legs 40 and 42 are in turn pivotally coupled to each other by a pin 50, carried by the leg 42, which rides in a slot 52 in the leg 40. The spring 44 encircles the pin 50 and has its opposite ends suitable received in notches 54 and 56 in legs 40 and 42, respectively, for biasing the legs 40 and 42 into the position shown in FIG. 1. As the legs 40 and 42 pivot into the position shown in FIG. 1, the pin 50 carries the encircled portion of the spring 44 over center and then drops into a recess 58 at the same time that a flange 60 on the leg 42 abuts an edge of the leg 40. The various housing sections are moved into their collapsed positions by rotating the leg 40 in a counterclockwise direction until the pin 50 moves the encircled portion of the spring 44 over center at which point the user now applies a force to the housing section 14 to rotate it in a counterclockwise manner into the position shown in FIG. 2 wherein it is releasably maintained by suitable means (not shown).

The housing section 12 includes a chamber 62 defined in part by a partition 64, to which a portion of the bellows 20 is secured, having an exposure aperture 66 therein and a bottom wall 68. The chamber 62 is adapted to receive and support a film cassette 70 in position for exposure of a film unit contained therein. The cassette 70 includes an exposure aperture 72, an exit slot 74 in the leading end wall through which the film unit may be moved, subsequent to exposure, and a slot (not shown) formed in the cassette's forward and trailing end walls (to the right in FIG. 1) through which suitable means, such as the film advancing means shown in the aforementioned U.S. Pat. No. 3,709,122, may extend so as to engage the forwardmost film unit and advance it into the bite of the rollers 32 via slot 74. Suitable means such as resilient members 76 (only one being shown) may be provided for urging the forward wall of the cassette into engagement with the partition 64 so as to locate the forwardmost film unit in the cassette in position to be moved into the focal plane after the cassette's dark slide has been removed.

The second housing section 14 includes a chamber 78 defined in part by a partition 80 having an exposure aperture 82 therein, a loading door 84 and end walls 86 and 88. The loading door 84 is pivotally coupled to the end wall 86 at 90 for movement in a clockwise direction from its closed position to its open position wherein a film cassette 92 may be inserted in the chamber 78. The cassette includes a forward wall having an exposure aperture 94 therein, a slot 96 in a leading end wall through which a film unit may be removed from the cassette subsequent to exposure and a slot 98 (see FIG. 3) through which film advancing means 100 are adapted to extend so as to engage the trailing edge of the forwardmost film unit in the cassette and advance the film unit through the slot 96 and into engagement with a pair of spread rollers 102 and 104. Suitable means such as resilient members 106 (only one being shown) attached to the loading door 84 may be provided for urging the forward wall of the cassette 92 against the partition 80 when the cassette is secured within the chamber 78. Mounted adjacent to and in overlying relation to the loading door 84 is an imbibition chamber 108 having an open end 110. The imbibition chamber 108 is pivotally coupled to the housing section 14 for movement between its stored position, as shown in solid lines in FIG. 1, to its operative position, as shown in broken lines, wherein its open end 110 is located in lighttight relation with the exit side of the spread rollers 102 and 104 and in position to receive a film unit as it emerges from the rollers 102 and 104. The imbibition chamber may be formed from any suitable light attenuating material which will insure that any light which enters the chamber while it is in its operative position will be at a level which will not adversely affect the formation of the developed image. For example, the attenuation of the light for the film unit described in the aforementioned U.S. Pat. No. 3,396,647 should be much greater than that for the film unit described in said U.S. Pat. No. 3,594,165. The imbibition chamber is preferably formed with a normally closed slit (not shown) in wall 114 through which the exposed film unit may be withdrawn from the chamber. Obviously, if the film unit passing through the rollers 102 and 104 is of the type that no longer needs to be protected from the ambient light outside of the camera then the user of the camera may use the imbibition chamber as a film holder or alternatively, fold the imbibition chamber into its inoperative position and allow the film unit to come directly into the light.

As mentioned hereinbefore, the camera 10 includes a single lens reflex viewing system. The system includes a viewing lens 116, a pair of mirrors 118 and 120 and of course the camera's objective in the shutter and lens assembly 24. The image bearing light rays pass through the normally open lens and shutter assembly 24 and toward the mirror 120 where they are reflected onto the mirror 118 which in turn direct them through the viewing lens 116.

Each of the mirrors 118 and 120 is mounted for automatic movement between its operative extended position, as shown in solid lines in FIG. 1, and its inoperative collapsed position, as shown in broken lines in FIG. 1 and in solid lines in FIG. 2. Specifically, one end of the mirror 118 is pivotally mounted at 122 to a plate 124. A post 126 is secured to the back side of the mirror 118 and is adapted to anchor one end of a cable 128. The cable 128 extends from its attachment point to the post 126 to a pulley 130 mounted on the plate 124. The cable wraps around the pulley 130 and has its terminal end secured at 132 to the housing section 14. The cable 128 is provided with a resilient section 134 intermediate its ends for insuring that the cable is taut when the mirror abuts against its stop 136. A spring 138 is provided for biasing the mirror 118 in a clockwise manner into the same plane as the plate 124 whereat further clockwise rotation is prevented by suitable stop means (not shown).

In a similar manner, one end of the mirror 120 is pivotally mounted at 140 to a plate 142. A post 144 is mounted on the back side of the mirror 120 for receiving one end of a cable 146. The cable 146 extends from the post 144 around a pulley 148 mounted on the plate 142 and then is secured at 150 to the housing section 12. The cable 146 is provided with a resilient section 152 intermediate its ends for insuring that the cable is taut when the mirror 120 abuts against its stop 154. A spring 156 is provided for biasing the mirror 120 in a counterclockwise direction into a plane containing the plate 142 whereat further counterclockwise rotation of the mirror 120 about pivot 140 is prevented by suitable means (not shown).

The plate 142 is pivotally coupled at 158 to the interior framework of the camera. A link 160 has one of its ends secured to the plate 142 and its other end pivotally coupled to an arm 162 of a solenoid 164. When the solenoid 164 is energized, the arm 162 moves to the right against an internal spring bias to move the link 160 to the position indicated by 160′ thereby rotating the plate 142 and the mirror 120 in a counterclockwise direction into the position shown in broken lines. As the plate 142 and the mirror 120 are rotated toward the broken line position, the pulley 148 gradually moves closer to the point 150 at which one end of the cable 146 is secured thereby gradually decreasing the tautness in the cable. As the tautness lessens in the cable 146 the spring 156 progressively picks up any slack in the cable as it rotates the mirror in a counterclockwise direction about the pivot 140 until it lies in the same plane as the plate 142. The converse is true when the plate 142 and the mirror 120 are moved into their solid line positions, i.e., the mirror 120 stays in the same plane as the plate 142 until the pulley has been rotated into a position wherein it applies a force to the cable 146 which opposes the force of the spring 156. Further rotation of the pulley about the pivot 158 gradually increases the tautness of the cable 146 while simultaneously pivoting the mirror 120 about its pivot 140 until it engages its stop 154.

Each of the housing sections 12 and 14 is provided with means for preventing the inadvertent exposure of a film unit during the viewing and focusing operation. In the case of the housing section 12 these means take the form of a cover 166 having a mirror 168 on one side thereof. The cover 166 is pivotally mounted at 170 to the camera's internal structure for movement between a first position wherein it overlies the film cassette 70 and precludes light from the lens and shutter assembly 24 from exposing the foremost film unit in the cassette and a second erected position wherein it lies closely adjacent to the erected plate 142 such that its mirrored side 168 is in position to reflect image bearing light onto the foremost film unit in the cassette 170 when that film unit has been selected for exposure. For reasons of clarity, the mechanism for pivoting the cover 166, removing the exposed film unit from the cassette 70 and driving the roller assembly 32 has not been shown but may take any suitable form such as that shown in the aforementioned U.S. Pat. No. 3,709,122.

The housing section 14 is provided with a shade or light shield 172 formed from any suitable opaque material for preventing inadvertent exposure of the foremost film unit in the cassette 92. The shade 172, which has a width substantially equal to that of the film cassette 92, has one of its ends secured to a roller 174 which in turn is rotatably mounted upon a fixed shaft 176 and its other end secured to a roller 178. An idler roller 180 is mounted intermediate the rollers 174 and 178 so as to change the direction that the shade 172 is wound upon the roller 178 and to keep the shade 172 in close proximity to the exposure aperture 94 in the film cassette 92. The shade is provided with an exposure aperture 182 which is coextensive with the exposure aperture 94 in the film cassette.

The roller 178 is fixedly secured to a shaft 184 which in turn is suitably supported for rotation about its longitudinal axis. One end of the shaft 184 is splined at 186 so as to slidably receive a correspondingly splined gear 188. The gear 188, the shaft 184 and the roller 178 are adapted to be driven in a counterclockwise direction by a gear 190 mounted on one end of the spread roller 104 which in turn is driven by a gear 192 which is fixedly attached to the shaft 194 of a motor 196. The gear 188 is maintained in mesh with the gear 190 by a coil spring 198 which encircles the splined portion 186 of the shaft 184. However, means are provided for moving the gear 188 out of mesh with the gear 190 when it is desired that the exposure aperture 182 in the shade 172 should be moved into alignment with the exposure aperture 96 in the cassette 92, as shown in FIG. 6. Specifically, these means comprise a bifurcated member 200 the arms 202 and 204 of which straddle the shaft 184 (see FIG. 4). The lower end of the member 200 is pivotally connected at 206 to the camera's internal structure. Also, the lower end of the member is provided with an aperture for receiving the movable arm 208 of a solenoid 210. Suitable means such as lock washers 212 may be provided on the arm 208 for securing it to the member 200. As is readily apparent from viewing FIG. 4, the arm 208 moves to the left when the solenoid 210 is energized thereby rotating the bifurcated member 200 in a counterclockwise direction about its pivot 206. This action results in the arms 202 and 204 sliding the gear 188 along the splines 186 until it is out of mesh with the gear 190. At this point the gear 188, the shaft 184 and the roller 178 are free to rotate about the axis of the shaft 184. At this point it should be noted that when the shade 172 was substantially unwound from the roller 174 and simultaneously wound upon the roller 178, as depicted in FIG. 5, a coil spring (not shown) having one of its ends secured to the shaft 176 and its other end secured to the roller 174 was wound up or charged so as to bias the roller for rotation in a clockwise manner. However, the charged force of this coil spring, as transmitted to the roller 178 via the shade 172, is not sufficient to unwind the shade 172 from the roller 178 as long as the gears 188 and 190 are in mesh because of the resistance of the rollers 102 and 104 and the motor 196. Once the gear 188 moves out of mesh with the gear 190, the coil spring associated with the roller 174 rotates the latter in a clockwise direction thereby winding a portion of the shade onto the roller 174 while simultaneously unwinding the shade 172 from the roller 178 until the exposure aperture 182 in the shade is located in alignment with the exposure aperture 96 in the film cassette 92.

Mounted on one side of the housing section 18 is a film selector 214 the dial of which may be rotated to either the letter "A," which indicates that the film unit located in the housing section 12 has been selected for exposure, or to the letter "B," which indicates that the film unit located in the housing section 14 has been selected for exposure. The camera is also provided with two electrical circuits, one for controlling the exposure cycle of the film unit in the housing section 12 and the other for controlling the exposure cycle of the film unit located in the housing section in the housing section 14.

The various components of the camera are in the positions shown in FIG. 1 when the camera is in its extended operative position. When the operator of the camera selects which of the two types of film he wishes to expose, he connects the appropriate electrical circuit with a source of electrical energy, e.g., a battery which may be located in the related film cassette or with a battery which is mounted within a battery compartment within the camera. After selecting the type of film to be exposed, the operator views the image of the subject which has been directed to the lens 116 by the normally open lens and shutter assembly and the mirrors 120 and 118. The subject is then brought into focus and an exposure initiating button 216 is depressed to start an exposure cycle. Assuming the film selector has been dialed to the letter "A," depression of the button 216 causes the closing of the shutter and lens assembly 24. As soon as the shutter has been closed, the cover 166 is pivoted about 170 in a clockwise direction until it reaches its erected position closely adjacent to the plate 142 wherein its mirrored surface 168 is now facing the lens and shutter assembly 24. The shutter is now opened, the exposure interval timed by the camera's exposure control circuit, and the exposure is terminated by closing the shutter. During the exposure, the image bearing light has been directed onto the mirrored surface 168 by the lens. The surface 168 in turn reflects the light through the exposure aperture 72 in the film cassette 70 and onto the foremost film unit contained therein. The cover 166 is then returned to its original position shown in FIG. 1 and the camera's film advancing apparatus (not shown) and the roller assembly 32 are then temporarily driven to move the exposed film unit out of the film cassette 70 via opening 74, through the rotating rollers of the roller assembly 32 which spread a processing fluid across the exposed photosensitive element of the film unit, and against the deflecting plate 34 which directs the film unit to the exterior of the camera, all as is well known in the art. The shutter is then opened to permit viewing of the subject again.

When the film selector has been dialed to the letter "B," depression of the button 216 starts an exposure cycle by causing the shutter and lens assembly 24 to close. The solenoid 164 is then energized to pivot the plate 142 and the mirror 120 from their solid line position in FIG. 1 to their broken line position. Simultaneously therewith, or shortly thereafter, the viewfinder is closed and the solenoid 210 is energized to move the gear 188 out of mesh with the gear 190 thereby allowing the roller 174 to rotate in a clockwise direction under the force of its coil spring. This rotation of the roller 174 results in the exposure aperture 182 in the shade 172 being unwound from the roller 178 and driven to the position shown in FIG. 6 wherein it is located in alignment with the exposure aperture 96 in the cassette 92. The shutter is then opened, the exposure interval timed and the exposure terminated by closing the shutter. After the shutter has been closed, the solenoid 210 is deenergized thereby allowing the spring 198 to move the gear 188 back into mesh with the gear 190. The motor 196 is then temporarily energized to drive the spread roller 104 and rewind the exposure aperture 182 in the shade 172 back onto the roller 178 thereby progressively covering the exposed film unit with the opaque portion of the shade 172 while simultaneously charging or rewinding the coil spring of the roller 174, as described hereinbefore. At the same time that the motor 196 is energized, the film advancing means 100 is energized or pulsed to move its arm 222 to the right and back to its original position. The arm 222 carries a block 224 to which one end of a resilient strip of metal 226 is attached. The strip 226 includes a portion 228 which extends between the shade 172 and the film cassette 92 and terminates in an upwardly turned pick or film engaging portion 230 which is adapted to engage the trailing edge of the foremost film unit in the cassette 92. When the arm is momentarily moved to the right, as viewed in FIG. 3, the pick 230 engages the edge of the foremost or exposed film unit and advances its opposite edge through the exit slot 96 and into the bite of the rotating rollers 102 and 104. The rollers 102 and 104 rupture a pod of processing fluid carried by the film unit and spread its contents across the photosensitive layer of the film unit to initiate the formation of a visible image within the film unit. The film unit is then deposited into the imbibition chamber 108 or directed to the exterior of the camera. The motor 196 is then deenergized, as is the solenoid 164 thereby allowing the arm 162 under its spring bias to return the plate 142 and the mirror 120 to the raised solid line position shown in FIG. 1 and the viewfinder and shutter opened to permit viewing for the next exposure.

After the last exposure has been made, the camera may be folded or collapsed by applying a force to the erecting link 38 which will move the pin 50 out of the recess 58 in the slot 52 and past its dead center position. The operator of the camera then maintains a steady downwardly directed force on the housing section 14 to cause it to rotate in a counterclockwise direction about the pivot 158. This movement of the housing section 14 is translated to the mirrors 118 and 120 to automatically move them from their erected viewing positions to their non-viewing positions as the camera is being collapsed. Specifically, as the housing section 14 is rotated as described, the attachment point 132 for the cable 128 moves toward the pulley 130 thereby introducing slack into the cable 128 which is immediately taken up by the spring 138 pivoting the mirror 118 in a clockwise direction. At substantially the same time that the mirror 118 started to move into its non-viewing position, the mirror 120 started to move into its non-viewing positions wherein it would lie beneath the mirror 118. As can be seen in FIG. 1, the above-described movement of the housing section 14 is translated to a flange 232 on the plate 142 by a spring 234. The spring 234 has one of its arms fixedly secured at 236 to a flange 238 of the housing section 14 while its other arm is merely positioned in engagement with the flange 232. As the plate 142 is rotated in a counterclockwise direction, the pulley 148 moves closer to the attachment point 150 of the cable 146 thereby progressively decreasing the force which it applies against the cable 146. As previously described, this action permits the spring 156 to pivot the mirror 120 into a plane containing the plate 142. Finally, when the housing section 14 is located in superposed relation to the housing section 12, as shown in FIG. 2, the two housing sections are latched together by any suitable means.

Figure 7:
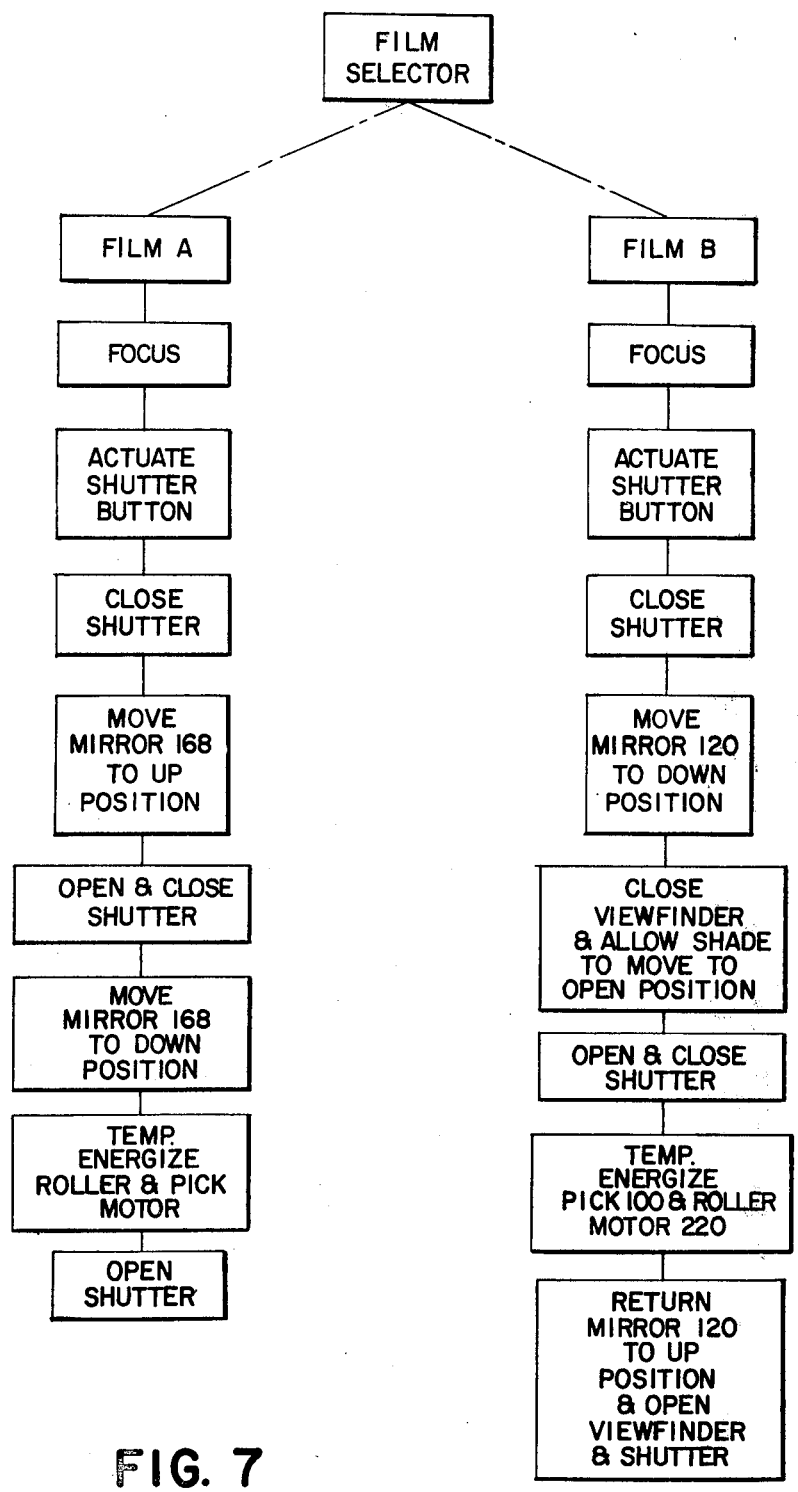
FIG. 7 is a flow chart showing the various steps which are carried out in accordance with the type of film selected to be exposed.

Since certain changes may be made in the above apparatus without departing from the scope of the invention herein involved, it is intended that all matter contained in the above-described description and shown in the accompanying drawings shall be interpreted as illustrative and not in a limiting sense. For example, while FIG. 7 depicts the preferred order of steps in each exposure cycle it should be obvious that some of them may be interchanged without materially affecting the exposure cycle.

What is claimed is:

1. A camera comprising:
    a first housing section including means for supporting a first film cassette in position for exposure of a film unit contained therein;
    a second housing section including means for supporting a second film cassette in position for exposure of a film unit contained therein;
    means for exposing either the film unit in the first cassette or the film unit contained in the second cassette;
    means for coupling said first and second housing sections to each other for movement between a collapsed inoperative position and an extended operative position;
    at least two reflective members mounted within said camera forming components of a viewing system; and
    means for mounting said reflective members for automatic movement between viewing and nonviewing positions as said first and second housing sections are moved between said extended operative position and said collapsed inoperative position, respectively.

2. A camera as defined in claim 1 wherein said exposing means includes means for geometrically reversing the image of a subject an odd number of times when a film unit located in said first housing section is to be exposed and for geometrically reversing the image of a subject an even number of times when a film unit located in said second housing section is to be exposed.

3. A camera comprising:
    means for defining a first chamber for receiving and supporting a first film cassette in position for exposure of a film unit contained therein;
    means for defining a second chamber for receiving and supporting a second film cassette in position for exposure of a film unit contained therein;
    means for initiating an exposure cycle;
    means including a lens and a normally open shutter for exposing the film unit in either the first or second film cassettes;
    first means mounted in said camera for movement between a first position wherein it precludes light from said lens from exposing the film unit in the first film cassette when supported within said first chamber and a second position wherein it reflects light from said lens onto the film unit in the first film cassette to photographically expose it;
    second means mounted in said camera for movement between a first position wherein it is located in a path between said lens and the film unit in the second film cassette when supported within said second chamber and functions as a component of a single lens reflex viewing system and a second position wherein it is located out of said path;
    third means mounted for movement between a first position wherein it prevents light from exposing the film unit in the second film cassette when so supported within said second chamber and a second position wherein light travelling along said path may expose the film unit in the second film cassette;
    means for selecting either the film unit in said first chamber or the film unit in said second chamber for exposure; and
    means responsive to actuation of said exposure initiating means for moving said first means from its said first position to its said second position when said selecting means has selected the film unit in said first chamber for exposure and for moving said second and third means from their said first positions to their said second positions while said first means in maintained in its said first position when said selecting means has selected the film unit in said second chamber to be exposed.

4. A camera as defined in claim 3 further including means for coupling said first and second chambers for movement between an operative extended position and an inoperative collapsed position.

5. A camera as defined in claim 4 further including means for resiliently biasing said second means toward its said second position and means for providing an overriding force to said biasing means when said second means is in its said first position.

6. A camera as defined in claim 5 wherein said overriding force is automatically reduced to a level below the force of said biasing means as said second means moves from its said first position to its said second position.

7. A camera as defined in claim 3 wherein said second means includes a generally planar support member and a generally planar mirror pivotally coupled thereto such that they are angularly disposed when said second means is in its said first position and they are coplanar when said second means is in its said second position.

8. A camera as defined in claim 3 further including a pair of pressure applying members mounted adjacent one end of at least one of said first and second chambers in position to receive a film unit as it is being advanced from the film cassette in said at least one film chamber and spread a processing fluid across an exposed photosensitive area thereof.

* * * * *